(12) United States Patent
Curry

(10) Patent No.: US 6,298,134 B1
(45) Date of Patent: Oct. 2, 2001

(54) SYSTEM FOR PROTECTING TELECOMMUNICATIONS EQUIPMENT FROM TRANSIENT VOLTAGES

(75) Inventor: William Curry, Angier, NC (US)

(73) Assignee: Tyco Electronics Corporation, Fuquay-Varina, NC (US)

( * ) Notice: Subject to any disclaimer, the term of this patent is extended or adjusted under 35 U.S.C. 154(b) by 0 days.

(21) Appl. No.: 09/395,955

(22) Filed: Sep. 14, 1999

(51) Int. Cl.[7] .................................................. H04N 1/00
(52) U.S. Cl. .............................................. 379/412; 379/399
(58) Field of Search ...................................... 379/412, 399; 361/56, 93.8, 93.9, 106, 111, 119, 120; 307/100, 31, 42

(56) References Cited

U.S. PATENT DOCUMENTS

| 5,953,194 | * | 9/1999 | Atkins | 361/119 |
| 6,188,557 | * | 2/2001 | Chaudhry | 361/111 |

FOREIGN PATENT DOCUMENTS

| 0 393 333 A | 10/1990 | (EP) . |
| 2 267 789 A | 12/1993 | (GB) . |
| WO 97 07580 | 2/1997 | (WO) . |

* cited by examiner

*Primary Examiner*—Forester W. Isen
*Assistant Examiner*—Jefferey F. Harold
(74) *Attorney, Agent, or Firm*—Howrey Simons Arnold & White; Michael J. Bell

(57) ABSTRACT

A system that protects telecommunications equipment from AC power faults and voltage transients comprising (1) a high-energy foldback device between the current-carrying lines of a telephone system and ground; (2) a voltage clamping device between the current-carrying lines; (3) a foldback device between the current-carrying lines and ground; (4) a first overcurrent protection device connected in series with the above foldback device; and (5) a second overcurrent protection device in the lines between the high-energy foldback device and the above mentioned serially connected foldback device and first overcurrent protection device. The system may be used, for example, with standard telephone lines, PBX out-of-building lines, special service lines such as carrier, pair-gain, and high speed data, and dedicated voice-band services such as pay phones and traffic-control communication lines.

14 Claims, 2 Drawing Sheets

SYSTEM FOR PROTECTING TELECOMMUNICATIONS EQUIPMENT FROM TRANSIENT VOLTAGES

FIELD OF THE INVENTION

This invention relates to the protection of telecommunications equipment from voltage transients.

BACKGROUND OF THE INVENTION

Voltage transients may be produced in electrical circuits by a variety of things, such as lightning, AC power line induction or contact, electrostatic discharge or pulses generated by operation of electrical equipment. These phenomena can generate large currents on cables, telecommunications equipment, aircraft, and ships. Voltage transients can also penetrate and damage electrical systems, causing hardware damage or loss of stored data. Thus, voltage transients represent a threat to electrical/electronic equipment, especially in telecommunications equipment.

Various circuits and systems have been used for protecting telecommunications equipment from voltage transients. For example, circuits used with PBX out-of-building lines, special service lines such as carrier, pair-gain, and high speed data, and dedicated voice-band services such as pay phones and traffic-control communication lines have been designed to reduce damage caused by voltage transients. Conventional circuits utilize gas discharge tubes, transient voltage suppression thyristors, resistors, capacitors, inductors, avalanche diodes, and metal oxide varistors, to clamp transient voltages at prescribed potentials. These circuits may include a filter circuit comprising RC, RL or RLC circuits that are used to cutoff a prescribed range of frequencies. Sometimes the filtering is intentional, and sometimes it is not. Moreover, in order to have an effective filter circuit, the circuit designer must ensure that the resistance, capacitance and/or inductance values are maintained in a prescribed ratio. However, finding and maintaining a suitable "prescribed ratio" is no small task. In addition, the use of capacitors and inductors in a circuit or system can have a negative impact in terms of performance. For example, the saturation tendency of an inductor reduces its usefulness during impulse surges, especially at higher currents and slower risetimes. Nonetheless, conventional circuits have not considered eliminating capacitors, inductors and filtering from the overall design.

In light of the foregoing, there is a need for a system that protects telecommunications equipment from voltage transients as effectively as those heretofore developed, but which does not include capacitors, inductors and filtering.

SUMMARY OF THE INVENTION

The present invention is a system which substantially obviates one or more of the disadvantages of the conventional circuits.

An advantage of the present invention is that it provides an improved system for protecting telecommunications equipment from voltage transients with the elimination of filtering.

Another advantage of the present invention is that it provides a simple system that protects telecommunications equipment from voltage transients.

Another advantage of the present invention is that it improves voltage-limiting at slower impulse risetimes.

Another advantage of the present invention is that it manages developed, transversal voltage transients.

Another advantage of the present invention is that it increases the overall bandwidth of a system that protects telecommunications equipment from voltage transients.

Yet another advantage of the present invention is that it overcomes the system and component failure problems associated with capacitors and inductors.

Additional features and advantages of the invention will be set forth in the description which follows, and in part will be apparent from the description, or may be learned by practice of the invention. The objectives and other advantages of the invention will be realized and attained by the system particularly pointed out in the written description and claims hereof as well as the appended drawings.

To achieve these and other advantages and in accordance with the purpose of the invention, as embodied and broadly described, the invention includes a high-energy foldback device between the current-carrying lines of a telephone system and ground; a voltage clamping device between the current-carrying lines; a foldback device between the current-carrying lines and ground; a first overcurrent protection device connected in series with the above foldback device; and a second overcurrent protection device in the lines between the high-energy foldback device and the above mentioned serially connected foldback device and first overcurrent protection device.

It is understood that both the foregoing general description and the following detailed description are exemplary and explanatory and are intended to provide further explanation of the invention as claimed.

The accompanying drawings are included to provide a further understanding of the invention and are incorporated in and constitute a part of this specification. The drawings illustrate two embodiments of the invention and together with the description serve to explain the principles of the invention.

DETAILED DESCRIPTION OF EXEMPLARY EMBODIMENTS

Reference will now be made in detail to the present preferred embodiments of the invention, examples of which are illustrated in the accompanying drawings.

Figure 1:
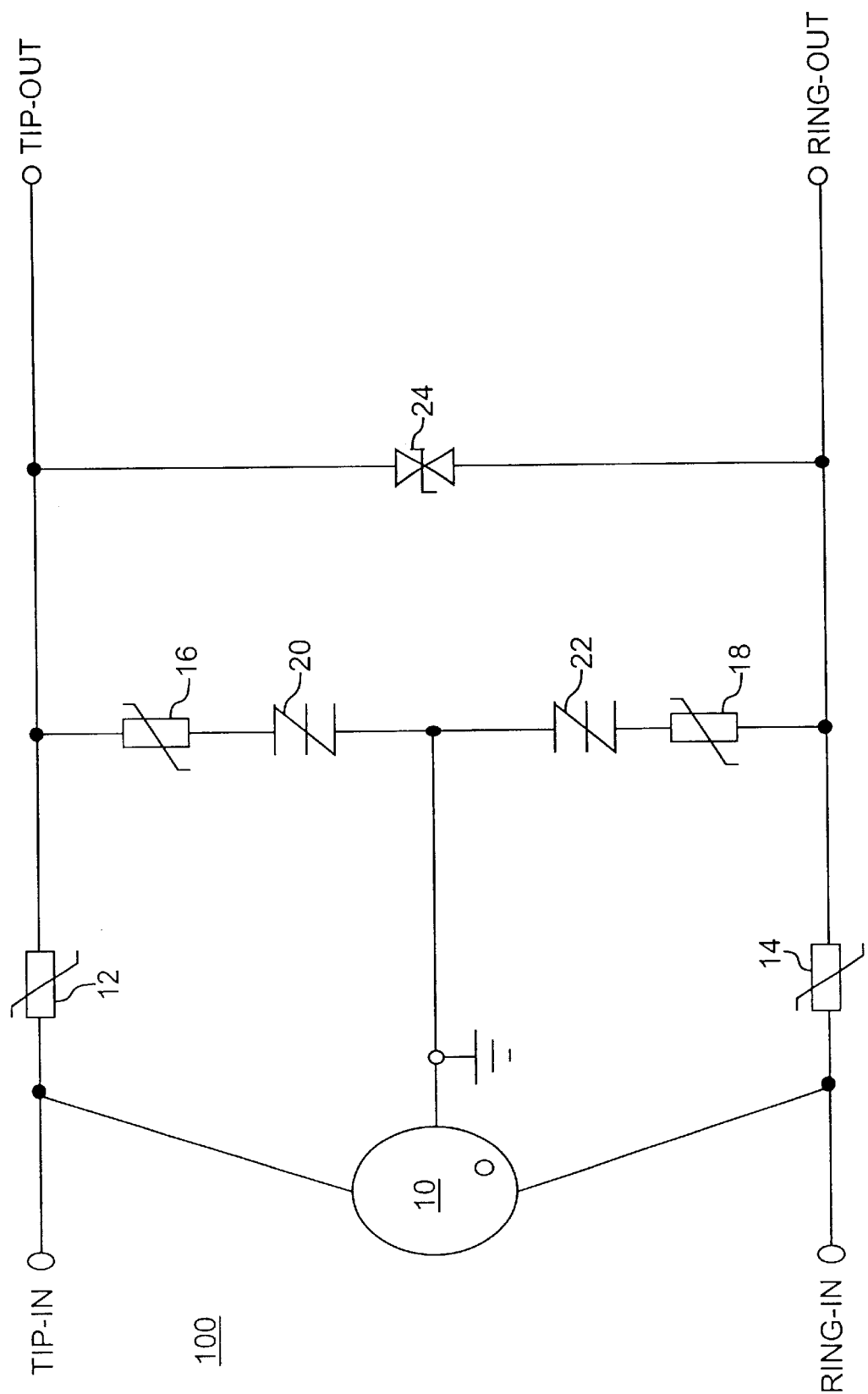
FIG. 1 is a schematic depiction of a system for protecting telecommunications equipment from transient voltages arranged in accordance with one embodiment of the present invention.

An exemplary embodiment of the system of the present invention is shown schematically in FIG. 1 and is designated generally by reference numeral 100. The system 100 in FIG. 1 is preferably adapted for use on the conventional current-carrying lines of a telephone system, the TIP and RING lines, and a common ground. The TIP-IN and RING-IN sources operate as the input. The TIP-OUT and RING-OUT sources operate as the output. However, the system 100 is intended to operate on any type of current-carrying lines of a telecommunications system regardless of designation.

As embodied herein and referring to FIG. 1, the system 100 includes a voltage clamping device 24. The voltage clamping device 24 is a bi-directional device that essentially acts as an open circuit until the voltage across it reaches a breakdown voltage at which time it acts as a voltage regulating circuit with a constant voltage across it (its breakdown voltage). A voltage clamping device may be selected from a number of well known devices that have voltage limiting properties. For example, back-to-back diode arrangements such as semiconductor diodes, avalanche diodes, or Zener diodes are voltage clamping devices. Other examples are non-linear resistors such as zinc oxide, silicon carbide or other varistor materials, and a gaseous voltage regulator. A voltage clamping device may also include other devices, but by way of example, FIG. 1 shows an avalanche diode as the voltage clamping device 24. In particular, 1.5 KE avalanche TVS diode is preferred. The breakdown voltage for such an avalanche diode depends on the telecommunications equipment and is typically set to a value that exceeds the maximum system operating voltage by a suitable tolerance margin. For equipment with low powering voltages (<33 V), such as a PBX system, a 33 V avalanche diode may be employed. But for equipment with higher powering voltages, a 250 V avalanche diode can be used.

As shown in FIG. 1, the voltage clamping device 24 is positioned between the TIP and RING lines. This allows the system to limit any differential (or normal-mode) voltages that might occur between the TIP and RING lines. Such differential voltages occur when the voltage on one line is changing with respect to the voltage on the other line. These differential voltages often result from the unbalanced operation of other voltage limiting components. The voltage clamping device 24 is thus used to prevent damage to equipment that could be caused by voltage differences between the TIP and RING lines. In that regard, a voltage clamping device 24 was chosen in preference to a foldback device (defined below) in order to avoid the switching transients that occur during the operation of foldback devices. Those transients are related to the operation of all foldback devices and are produced during the sudden change of impedance that occurs in the system when the device switches to its "on" state during an overvoltage event.

The system 100 also includes a high-energy foldback device 10 and foldback devices 20 and 22. A foldback device exhibits a high electrical resistance at low electrical voltages but whose resistance falls from a high value to a low value when subjected to a high voltage. Typical values for high and low resistance values are at least 100 kohms and less than 10 ohms, respectively. The device remains in its low resistance state only for as long as a small "holding current" is maintained through the device, otherwise it will automatically revert to its high resistance state. Examples of foldback devices include voltage controlled triacs, voltage controlled thyristors, gas discharge tubes (GDT), and carbon spark gaps.

The high-energy foldback device 10 is intended to protect the system from higher energy, longer duration voltage transients. It may, for example, comprise a spark gap or a GDT. The threshold voltage for the high-energy foldback device 10 is typically set to a value that exceeds the maximum system voltage by a suitable tolerance margin. By way of example, FIG. 1 shows a GDT as the high-energy foldback device 10. A suitable GDT is manufactured by Joslyn under the tradename "MiniTrigard" and operates at a threshold voltage of 230 V. As shown in FIG. 1, the GDT is positioned between the TIP and RING lines and ground. One of the well known deficiencies of the GDT is that its operational voltage, the voltage at which it operates or protects equipment, is dependent on the nature of the surge that it experiences. In particular, a GDT only operates at its nominal threshold voltage in response to a slowly changing voltage, such as an AC power fault (approximately 60 Hz). However, if a GDT experiences a fast changing voltage, such as lightning, the GDT will operate at voltage much higher than its prescribed threshold voltage because the GDT cannot respond and set up its internal arc mode fast enough to clamp or limit that voltage. Accordingly, the system 100 includes additional and often solid state components that are faster responding but more vulnerable than a GDT. In that regard, the system 100 includes foldback devices 20 and 22. By way of example, FIG. 1 shows a transient voltage suppression thyristor as foldback devices 20 and 22. Suitable transient voltage suppression thyristors are manufactured by Teccor under the catalog numbers P1500EB and P2300EB and by Texas Instruments under the catalog numbers TISP4180H3 and TISP4260H3. The rated off-state voltage for the foldback devices is selected at a value greater than the maximum system voltage. The foldback devices 20 and 22 are positioned between the TIP and RING lines and ground.

In addition, the system 100 further includes overcurrent protection devices 12, 14, 16 and 18. An overcurrent protection device protects the system from long lasting overcurrents, such as overcurrents caused by system failure, or by accidental or malicious connection with a power supply. Suitable devices include positive temperature coefficient (PTC) devices, especially ceramic or polymeric PTC devices. A PTC device is essentially a thermal resistor whose resistance increases non-linearly with temperature. Typically, when the current through a PTC device exceeds a certain level, the PTC device switches to a much higher resistance state. Thus, a PTC device functions much the same way that a fuse would, except that the PTC device will recover after the fault is removed. Hence, a PTC device is often referred to as the resettable equivalent of a fuse. Raychem Corporation manufacturers such devices under the registered trademark "POLYSWITCH". Suitable POLYSWITCHs for this system are the TR-250-145 and the TR-250-120, which are rated for 250 V and under normal operating conditions (low impedance) have a resistance ranging from three to twelve ohms. It should be noted that POLYSWITCHs are only responsive to sustained currents. By way of example, FIG. 1 shows a PTC device for overcurrent protection devices 12, 14, 16 and 18. These overcurrent protection devices are positioned in two types of locations within the system 100.

In the first type of location, as shown in FIG. 1, overcurrent protection devices 16 and 18 are serially connected to the foldback devices (not the high-energy foldback device) between the TIP and RING lines and ground. These devices protect the system from AC power events associated with faults that occur when the ground potential that the system is bonded to changes voltage. In such instances, it is possible for the foldback devices 20 and 22 to operate in a direction that would pass undesired fault currents into the system. Thus, the overcurrent protection devices 16 and 18 are used to interrupt any sort of fault current that arises from ground and could otherwise damage the equipment. In addition, these devices may help to protect the system from faults arising from ground that are associated with lightning.

In the second type of location, as shown in FIG. 1, overcurrent protection devices 12 and 14 are serially connected along the TIP and RING lines between the high-energy foldback device and the above mentioned serially connected foldback devices and overcurrent protection devices (from the first type of location). These devices act as the primary resettable fuses on the TIP and RING lines. Again, when the current through overcurrent protection devices 12 and 14 increases to a predetermined threshold value, the heat generated increases the resistance of the device to a very high level, thereby severely limiting the current (acting almost like an open circuit). Thus, these devices help to protect the system from any sort of fault current that arise anywhere along the TIP and RING lines.

Furthermore, the first overcurrent protection device and second overcurrent protection device connected in series to each ground-to-line foldback device (for example, first overcurrent protection device 16 and second overcurrent protection device 12 connected in series to foldback device 20) help to balance the overall operation of both foldback devices. More specifically, when only one of the foldback devices is operating, the resistance of the first overcurrent protection device and second overcurrent protection device in series with the operating foldback device lessens the differential voltage in the system. This differential voltage occurs because the operating foldback device brings its line side to a near ground potential while the opposite line side still experiences a rising overvoltage. Such a scenario is known to drive what is called a "circulating current" and can keep the unoperated side from ever operating at all. This can be damaging because the circulating current is driven through either the equipment or the voltage clamping device 24, which itself can be damaged by such an event.

Finally, the placement of the first overcurrent protection device and second overcurrent protection in the line-to-ground path of each foldback device helps to mitigate the switching transients associated with the use of foldback devices, as mentioned above.

Figure 2:
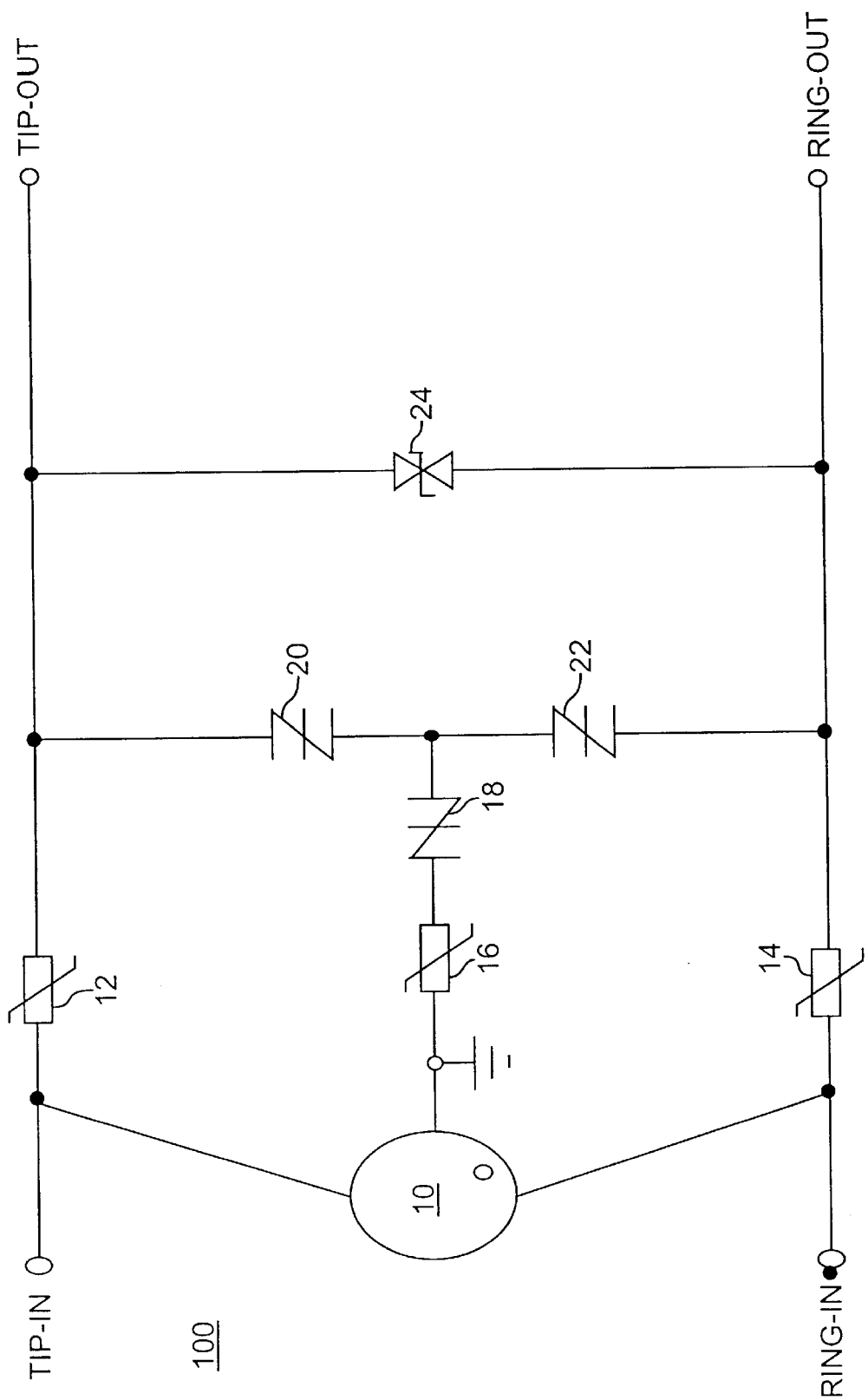
FIG. 2 is a schematic depiction of a system for protecting telecommunications equipment from transient voltages arranged in accordance with another embodiment of the present invention.

Another exemplary embodiment of the system of the present invention is schematically shown in FIG. 2 and is also designated generally by reference numeral 100. Again, the system 100 in FIG. 2 is preferably adapted for use on the conventional current-carrying lines of a telephone system, the TIP and RING lines, and a common ground. The difference between FIG. 1 and FIG. 2 occurs in the lines between the TIP and RING lines and ground where the overcurrent protection device is serially connected to the foldback devices. In particular, FIG. 2 differs from FIG. 1 in the manner that the devices are serially connected as well as in the actual number of devices. As shown in FIG. 2, overcurrent protection device 16 and foldback devices 18, 20 and 22 are serially connected in the lines between the TIP and RING lines and ground. These foldback devices and overcurrent protection device serve the same functions as their counterparts in FIG. 1. However, the embodiment in FIG. 1 is more effective in dealing with "circulating currents" than the embodiment shown in FIG. 2. By way of example, FIG. 2 shows a PTC device for overcurrent protection device 16 and a transient voltage suppression thyristor for foldback devices 18, 20 and 22. Again, a suitable PTC device is Raychem's POLYSWITCH TR-250-145. And suitable transient voltage suppression thyristors are manufactured by Teccor under the catalog numbers P1300EB, P0602AB and P2702AB. The other elements in the system (for example, the high energy foldback device 10) are the same for FIGS. 1 and 2.

It will be apparent to those skilled in the art that various modifications and variations can be made in the system of the present invention without departing from the spirit or scope of the invention. Thus, it is intended that the present invention cover the modifications and variations of this invention provided they come within the scope of the appended claims and their equivalents.

What is claimed:

1. A system for protecting telecommunications equipment from a transient voltage comprising:

a high-energy foldback device for voltage transients between current-carrying telephone lines and ground, said high-energy foldback device positioned between said current-carrying lines and ground;

a voltage clamping device for voltage transients between said current-carrying lines, said voltage clamping device positioned between the current-carrying lines;

a foldback device for voltage transients between said current-carrying lines and ground, said foldback device positioned between the current-carrying lines and ground;

a first overcurrent protection device for current faults on said current-carrying lines and ground, said first overcurrent protection device connected in series with said foldback device; and a second overcurrent protection device for current faults on said current-carrying lines, said second overcurrent protection device serially connected between said high-energy foldback device and said serially connected foldback device and first overcurrent protection device.

2. A system as claimed in claim 1, wherein said voltage clamping device is an avalanche diode.

3. A system as claimed in claim 2, wherein said breakdown voltage of the avalanche diode is in the range from 33V to 250V.

4. A system as claimed in claim 1, wherein said foldback device is a transient voltage suppression thyristor.

5. A system as claimed in claim 1, wherein said first overcurrent protection device is a PTC device.

6. A system as claimed in claim 1, wherein said second overcurrent protection device is a PTC device.

7. A system as claimed in claim 1, wherein said high-energy foldback device is a gas discharge tube.

8. An electrical circuit comprising:

telecommunications equipment comprising current-carrying telephone lines and ground;

an arrangement for protecting the electrical circuit from voltage transients, said arrangement comprising:

(1) a voltage clamping means for voltage transients between said current-carrying lines, said voltage clamping means positioned between said current-carrying lines;

(2) a foldback means for voltage transients between said current-carrying lines and ground, said foldback means positioned between the current-carrying lines and ground;

(3) a first overcurrent protection means for current faults on said current-carrying lines and ground, said first overcurrent protection means connected in series with said foldback means;

(4) a second overcurrent protection means for current faults on said current-carrying lines, said second overcurrent protection means serially connected between a high-energy foldback means and said serially connected foldback means and first overcurrent protection means; and (5) said high-energy foldback means for voltage transients between said current-carrying lines and ground, said high-energy foldback means positioned between said current-carrying lines and ground.

9. A circuit as claimed in claim 8, wherein said voltage clamping means is an avalanche diode.

10. A circuit as claimed in claim 9, wherein said breakdown voltage of the avalanche diode is in the range from 33V to 250V.

11. A circuit as claimed in claim 8, wherein said foldback means is a transient voltage suppression thyristor.

12. A circuit as claimed in claim 8, wherein said first overcurrent protection means is a PTC device.

13. A circuit as claimed in claim 8, wherein said second overcurrent protection means is a PTC device.

14. A circuit as claimed in claim 8, wherein said high-energy foldback means is a gas discharge tube.

* * * * *